United States Patent [19]
Werstlein

[11] 3,853,669
[45] Dec. 10, 1974

[54] WELDING TIP FOR PLASTIC WELDING GUN

[76] Inventor: Peter F. Werstlein, 4620 N.E. Glison St., Portland, Oreg. 97213

[22] Filed: Aug. 28, 1972

[21] Appl. No.: 284,232

[52] U.S. Cl. .............. 156/497, 156/306, 156/499, 156/574
[51] Int. Cl. ............................................ B29c 27/02
[58] Field of Search .......... 156/433, 497, 499, 574, 156/579, 322, 306

[56] References Cited
UNITED STATES PATENTS

| | | | |
|---|---|---|---|
| 3,047,050 | 7/1962 | Sourber | 156/497 |
| 3,371,188 | 2/1968 | Henes et al. | 156/497 |
| R24,801 | 3/1960 | Kaminsky | 156/497 |

FOREIGN PATENTS OR APPLICATIONS

| | | | |
|---|---|---|---|
| 818,066 | 8/1959 | Great Britain | 156/574 |
| 1,604,641 | 11/1970 | Germany | 156/497 |

Primary Examiner—Daniel J. Fritsch
Attorney, Agent, or Firm—Eugene M. Eckleman

[57] ABSTRACT

A welding tip for plastic welding guns having a hollow body member arranged for removable attachment to a hot air welding gun. The body member supports a guide tube for slidably receiving plastic welding rod. The guide tube supports a pair of plates which in turn support a pressure roller. The body member directs hot air from the hot air welding gun to a lower end of the tip and the arrangement is such that a lower end of a welding rod in the guide tube is softened for deposit in a weld seam. The tip structure is of metal or other heat absorbing material for distributing heat to the guide tube to preheat the welding rod. The pressure roller has a concaved peripheral surface portion for rolling out a smooth weld with the correct pressure.

1 Claim, 4 Drawing Figures

PATENTED DEC 10 1974 3,853,669

WELDING TIP FOR PLASTIC WELDING GUN

BACKGROUND OF THE INVENTION

This invention relates to new and useful improvements in welding tips for plastic welding guns.

It is frequently desirable to join two or more pieces of thermoplastic material together in a permanent connection. In most instances it is desired that the juncture of such pieces be accomplished by a pleasing seam. Plastic welding guns have heretofore been provided which utilize a hot stream of gas to fuse plastic for accomplishing the welding function, but the arrangement of feed means for the plastic and the tip constructions are such that it is extremely difficult for a worker to make a neat and strong seam. For example, in some welding guns now in use, the heat is applied by the gun and the plastic is fed from a separate device or by hand, thus making it difficult for operation by one hand. In other structures, the welding tips do not have a structure facilitating easy application of a smooth seam. The disadvantages of previous tips resides in their failure to provide an efficient heat transfer to a critical area of the tip and also in their failure to provide means for properly smoothing the weld.

SUMMARY OF THE INVENTION

According to the present invention and forming a primary objective thereof, a welding tip is provided for a plastic welding gun which accomplishes an efficient softening of the welding rod at the weld seam and which includes a pressure roller positioned and shaped so as to most efficiently apply softened plastic into the weld seam.

A more particular object of the present invention is to provide a welding tip of the type described which utilizes a hollow body member of metallic construction having an integral connection with a metallic guide tube for welding rod, these members being arranged to maintain the heat supplied from a welding gun to the body member for preheating the welding rod, such members also being associated with an integral metallic frame portion supporting a pressure roller for smoothing out the weld and applying correct pressure.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
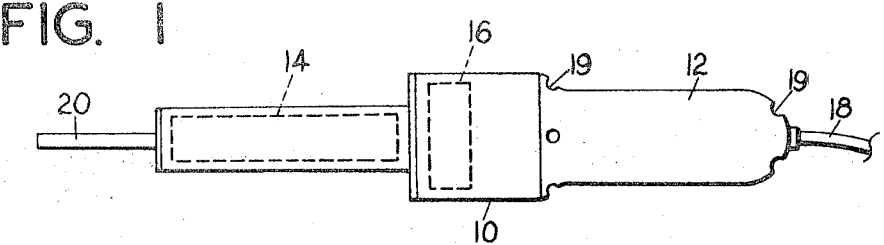
FIG. 1 is an elevational view of a plastic welding gun commonly in use.

Referring in particular to the drawings and first to FIG. 1, the numeral 10 designates a plastic welding gun presently in common use. Such a gun employs a handle portion 12 by means of which the gun may be gripped and manipulated. The gun includes an electric heating element 14 and a blower or fan 16. Electric lead wires 18 lead into the rearward end of the gun 10 and are suitably connected to the heating element 14 and the blower 16. The gun 10 has suitable apertures 19 for the inlet of air which is forcefully moved through a nozzle 20 after first being heated. As is known in the art, the stream of gas which is ejected from the nozzle 20 is of sufficient heated temperature to soften a thermoplastic material for the purpose of forming a weld joint.

Figure 2:
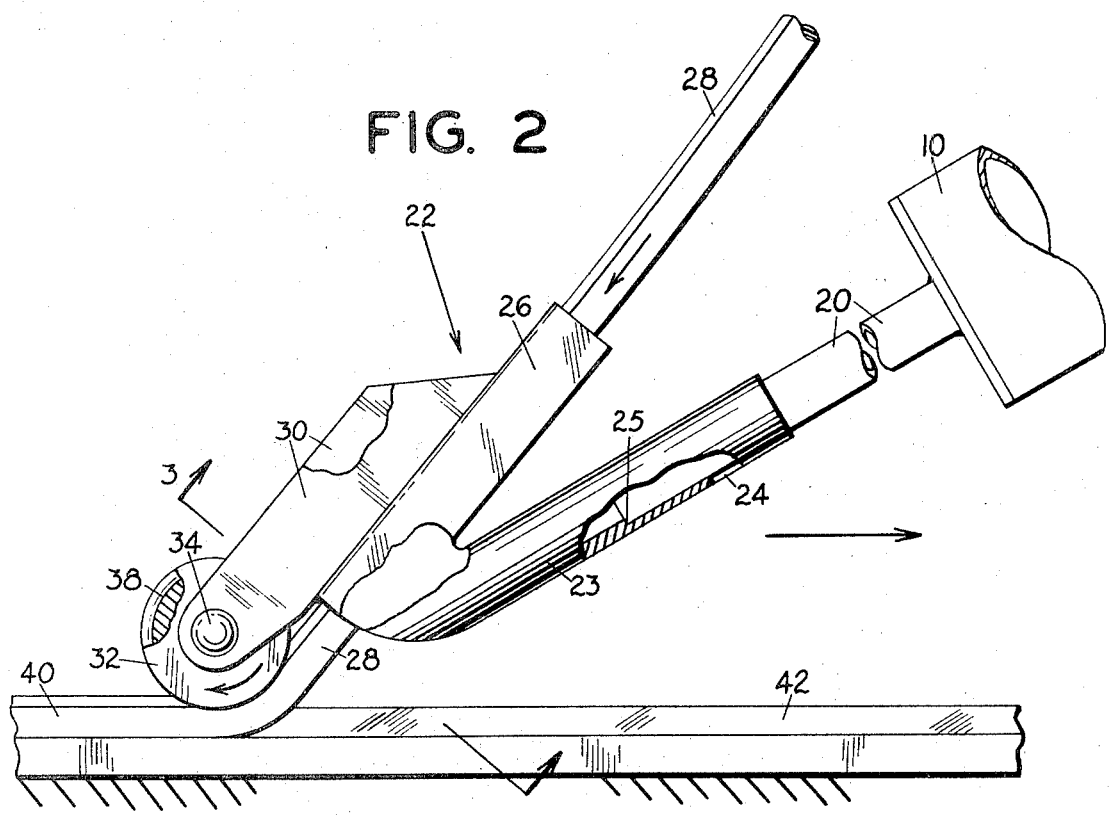
FIG. 2 is an enlarged fragmentary elevational view of the present welding tip mounted on a welding gun.
Figure 3:
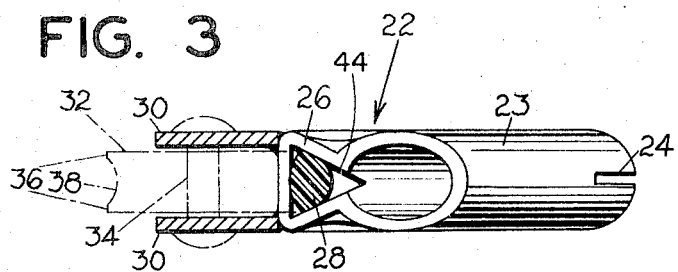
FIG. 3 is a bottom view taken on the line 3—3 of FIG. 2.

The present invention resides in the construction of a welding tip 22, FIGS. 2 and 3. This tip includes a tubular body member 23 which is of a selected diameter so as to frictionally receive and be mounted on the end of the nozzle 20 of a welding gun. The rearward end of the body member 23 is slotted at 24 to provide an effective frictional engagement on the nozzle, and a shoulder 25 is formed by a counterbored portion of the body member to limit inward positioning of the nozzle in the body member. Secured integrally to the forward end of the body member 23 is a guide tube 26 arranged to receive a welding rod 28, such guide tube being open at both ends whereby the welding rod can be inserted from the upper end and project at its lower end to the point of weld. As best seen in FIG. 2, the guide tube 26 extends at an acute angle from body member 23, and such arrangement is such that the welding rod will extend suitably to the point of weld with the tool held in an efficient welding position, namely, in about the angular position shown.

Figure 4:
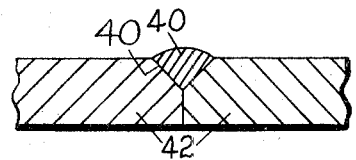
FIG. 4 is a fragmentary view in cross section of a welded seam produced by the present tip.

Secured integrally along an upper edge of guide tube 26, or in other words on the opposite side from the body member 23, are two plates or arms 30 supporting a shaft 34 at the lower end thereof. A pressure roller or wheel 32 is rotatably mounted on the shaft between the plates and such wheel is located in a predetermined position with relation to the positioning of the bottom end of the welding rod such that it rolls out the weld in a smooth seam with correct pressure. In this latter regard, particular reference is made to FIG. 3 which shows the edge contour of the pressure roller 32. More particularly, the edge of the roller includes a pair of narrow flat surfaces 36 adjacent to the edges and a central concaved portion 38 between the flat surfaces. Such shape of the roller surface forms a smooth weld seam 40, FIG. 4, between a pair of plates 42, or of course between other suitable members to be welded when the semi-liquid weld material is pressed down by the roller, the plates to be welded together having beveled edges 44 to receive the weld material.

In a welding operation, the gun is drawn rearwardly, namely, from left to right as viewed in FIG. 2 wherein the softened plastic from the rod contained in the guide tube is urged into the weld seam and smoothened out by the pressure roller 32.

Forming an important part of the invention, the present tool is made entirely from heat absorbing material, such as steel, whereby a substantial amount of the heat fed to the tool is retained in the tip. Such an arrangement operates more efficiently to soften the welding rod adjacent to the lower end of the tip and to puddle the same for forming a good weld seam. The structure of the tip causes the welding rod to be preheated toward the bottom of the guide tube 26 so that it will effectively soften at the discharge end of such guide tube.

Another important feature of the present invention resides in the lower end structure of the body member 23 and the guide tube 26. More particularly, the lower end portions of the body member 23 and the guide tube 26 are joined in a common wall, and a portion of such common wall is cut away in a rearwardly tapered V-slot 44, whereby hot air from the body member 23 is allowed to impinge against a portion of the welding rod above the bottom end of the guide tube 26, thus softening the welding rod for an improved presentation to the weld seam.

In accordance with the present invention, a welding tip is provided for plastic welding guns which forms a weld seam of very smooth characteristics. Moreover, the present tip makes it possible for the relatively unskilled workmen to do the job of a professional. The welding rod 28 may be triangular as shown or round if desired. The guide tube 26 will hold either shape.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A welding tip for plastic welding guns of the type having an outlet of heated gas for melting thermoplastic material to be used in a weld seam, comprising a hollow body member arranged to receive heated gas from the welding gun, said hollow body member having a lower open end for discharging the heated gas, a guide tube integral with said hollow body member at a forward portion thereof, said guide tube being integral with said hollow body member only at a lower portion thereof in a common wall structure, said guide tube leading upwardly from said body member above said common wall portion at an acute angle so as to be spaced forwardly of said body member through a greater portion of its length, said guide tube having open ends and being arranged to slidably guide a welding rod therethrough for presenting a portion thereof at the bottom to a weld seam at less than an acute angle under the influence of heated air from said body member, a portion of said common wall being cut away from the bottom between said body member and said guide tube to expose a lower portion of a welding rod above the lower end of the latter in said guide tube directly to heat from the hollow body member while still in the guide tube to preheat the rod, roller support means integral with said guide tube at a forward portion thereof, a pressure roller mounted on said roller support means in longitudinal alignment with said hollow body member and said guide tube and arranged to smoothen and press weld material softened by heated air from said hollow body member in a weld seam by drawing the roller thereover, said roller support means, said guide tube, and said hollow body member all being formed from a heat conducting material.

* * * * *